United States Patent
Arrasmith

(10) Patent No.: US 8,447,129 B2
(45) Date of Patent: May 21, 2013

(54) HIGH-SPEED DIVERSITY-BASED IMAGING METHOD FOR PARALLEL ATMOSPHERIC TURBULENCE COMPENSATION

(75) Inventor: William W. Arrasmith, Melbourne, FL (US)

(73) Assignee: Florida Institute of Technology, Melbourne, FL (US)

( * ) Notice: Subject to any disclaimer, the term of this patent is extended or adjusted under 35 U.S.C. 154(b) by 0 days.

(21) Appl. No.: 12/726,651

(22) Filed: Mar. 18, 2010

(65) Prior Publication Data

US 2012/0288212 A1    Nov. 15, 2012

Related U.S. Application Data

(60) Provisional application No. 61/161,263, filed on Mar. 18, 2009.

(51) Int. Cl.
*G06K 9/00* (2006.01)
*G06K 9/62* (2006.01)

(52) U.S. Cl.
USPC ............... 382/260; 382/131; 382/254

(58) Field of Classification Search
USPC ................ 382/131, 254, 260
See application file for complete search history.

(56) References Cited

U.S. PATENT DOCUMENTS

| | | | | |
|---|---|---|---|---|
| 5,414,782 A * | 5/1995 | Carasso | ............... | 382/270 |
| 5,627,918 A * | 5/1997 | Carasso | ............... | 382/254 |
| 5,841,911 A * | 11/1998 | Kopeika et al. | ............... | 382/254 |
| 8,243,353 B1 * | 8/2012 | Gutin et al. | ............... | 359/21 |

* cited by examiner

*Primary Examiner* — Wesley Tucker
(74) *Attorney, Agent, or Firm* — IP Strategies

(57) ABSTRACT

An imaging method providing atmospheric turbulence compensation includes capturing a subject image pair. Data corresponding to the captured subject image pair is loaded into memory associated with a parallel processing device. A 2-D Fast Fourier Transform is performed on the stored image data and the transformed image data is stored. An optical transfer function is developed for the transformed image data. The optical transfer function is inverted and applied to the transformed image data to generate corrected image spectrum data that is compensated for atmospheric aberrations. An Inverse Fast Fourier Transform is applied to the corrected image spectrum data to produce corrected image data. The corrected image data is stored.

15 Claims, 12 Drawing Sheets

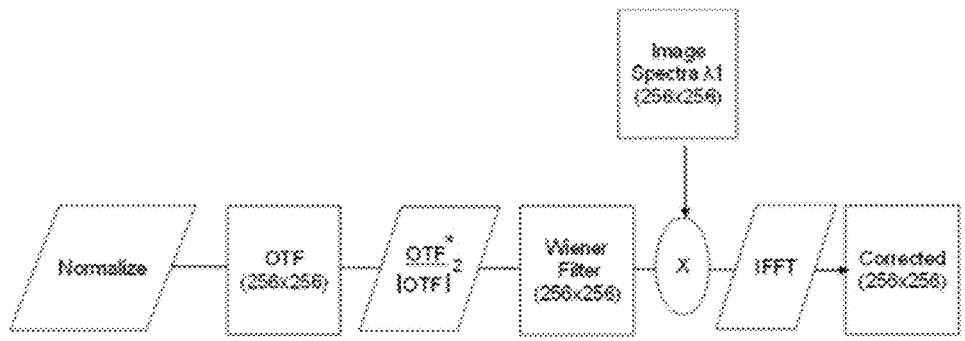

Fig. 9b

| Process | Action | Clk Latency | Time | 2.00E+08 | | | |
|---|---|---|---|---|---|---|---|
| Transfer Image, (λ1, λ2) | Write | | 5.24E-03 | | | | |
| Phase Difference | | | | | | | |
| image spectra | 2D FFT | 722432 | 3.61E-03 | | | | |
| error metric | Mult | 393216 | 1.97E-03 | | | | |
| | Sub & Min | 393216 | 1.97E-03 | Frame | Margin | | |
| Sub-total | | | 12.78 | 33.3 | 20.52 | ms | |
| | | | | | | | |
| Optical transfer Fx | | | | | | | |
| phase Map | Sub | 65536 | 3.28E-04 | | | | |
| impulse response | 2D FFT | 722432 | 3.61E-03 | | | | |
| $|h|^2$ | Mult | 262144 | 1.31E-03 | | | | |
| FFT | 2D FFT | 722432 | 3.61E-03 | Frame | Margin | | |
| Sub-total | | | 8.86 | 33.3 | 24.44 | ms | |
| | | | | | | | |
| Corrected Image | | | | | | | |
| Weiner Filter | Div | 65536 | 3.28E-04 | | | | |
| | Mult | 524288 | 2.62E-03 | | | | |
| | Mult | 262144 | 1.31E-03 | | | | |
| compensate | Mult | 65536 | 3.28E-04 | | | | |
| convert to time domain | 2D IFFT | 722432 | 3.61E-03 | | | | |
| Transfer Corrected Image | Read | | 2.62E-03 | Frame | Margin | | |
| Sub-total | | | 10.82 | 33.3 | 22.48 | ms | |
| | | | | | | | |
| Total | | | 32.47 | ms | | | |

Fig. 10

HIGH-SPEED DIVERSITY-BASED IMAGING METHOD FOR PARALLEL ATMOSPHERIC TURBULENCE COMPENSATION

CROSS-REFERENCE TO RELATED APPLICATION

This is related to and claims priority from U.S. Provisional Patent Application Ser. No. 61/161,263, which was filed on Mar. 18, 2009.

FIELD OF THE INVENTION

The present invention provides compensation for high-speed atmospheric turbulence effects and implementation of rapidly reconfigurable advanced/unconventional imaging techniques.

BACKGROUND OF THE INVENTION

Passive incoherent imaging techniques such as phase diversity and wavelength diversity have long been successfully used to compensate for atmospheric turbulence. Both diversity schemes traditionally use iterative 2-D Fourier transforms in a sequential error-reduction methodology that is typically slow and relegated to post-processing applications.

For optical imaging systems having apertures that are significantly larger than the atmospheric coherence length, $r_o$, the turbulent atmosphere usually is the most significant contributor to the imaging system's loss of resolution [1]. Atmospheric turbulence introduces aberrations that can significantly degrade the performance of an optical imaging system. The degradation in imaging performance depends on a variety of factors, such as the operating wavelength(s), the relative size of the imaging system's entrance pupil diameter as compared to the atmospheric coherence length, $r_o$ (Fried parameter), the angular instantaneous field of view (IFOV) as compared to the isoplanatic angle, $\theta_0$, sampling effects, signal-to-noise issues, and system effects such as imperfect optics, fixed pattern noise and platform jitter.

Given a circular aperture, the upper bound on achievable resolution is the so-called diffraction limit, $$\Delta x_{diff} = 1.22 \frac{\bar{\lambda}}{D} z, \qquad (1)$$

where $\bar{\lambda}$ is the center wavelength of the illuminating light, D is the diameter of the entrance pupil of the imaging system (for example, the diameter of the telescope, or camera lens), and z is the distance between the imaging system's entrance pupil and the object to be imaged. For example, an object located 2 km from a camera with a 4½ inch lens would have a diffraction-limited resolution of 1.059 cm at a center wavelength of 500 nm. This means that object features less than this size will not be resolved and object features larger than this size will be resolved if diffraction-limiting imaging conditions are attained.

Unfortunately, the atmosphere severely degrades the ability to achieve the diffraction-limited resolution indicated in equation (1). Instead, the conventionally-attainable maximum resolution of an imaging system that is looking through atmospheric turbulence is given by $$\Delta x_{atm} = 1.22 \frac{\bar{\lambda}}{r_0} z, \qquad (2)$$

where the expression in the denominator of equation (2) is the atmospheric coherence length, or Fried parameter. For imaging over horizontal paths, recent experimental values for $r_o$ have ranged from 1 to 4 cm leading to a "loss" of resolution of 11.52 (for an $r_o$ of 1 cm) or 2.88 (for an $r_o$ of 4 cm) with respect to the diffraction-limited resolution given in equation (I). Stated another way, by compensating for the effects of atmospheric turbulence, a maximum increase in resolution between 2.88 and 11.52 can be expected for the center wavelength and entrance-pupil diameter specified above with a suitable turbulence-compensation approach. These effects are even more dramatic when a telescopic imaging system is used. For instance, if an eight-inch telescope is attached to the camera or video-camera at optical wavelengths, the maximum increase in spatial resolution for the same values of $r_o$ above jumps to 20.32 (for an $r_o$ of 1 cm) or 5.08 (for an $r_o$ of 4 cm).

As can be seen by dividing equation (2) by equation (1), that the expected increase in resolution in a linear direction of an imaging system with entrance-pupil diameter D is given by $$R = \frac{\Delta x_{atm}}{\Delta x_{diff}} = \frac{D}{r_0}. \qquad (3)$$

With knowledge of the diameter of the imaging system's entrance pupil and the value of $r_o$ for an illuminating wavelength, equation (3) can be used to determine the maximum achievable increase in resolution, neglecting system effects and assuming full compensation of atmospheric turbulence.

If the value of $r_o$ is known at a given wavelength, then it can be scaled to another wavelength by $$r_0^{\lambda_2} = r_0^{\lambda_1} \cdot \left(\frac{\lambda_2}{\lambda_1}\right)^{\frac{6}{5}}, \qquad (4)$$

where $r_0^{\lambda_1}$ is the value of $r_o$ at $\lambda_1$ and $r_0^{\lambda_2}$ is the value of $r_o$ at wavelength of interest $\lambda_2$. For example, if the value of $r_o$ at the illuminating wavelength of 500 nm is 1 cm, then the value of $r_o$ at 1.06 µm is about 2.46 cm. Once the new value of $r_o$ is known, then equation (3) can be used to determine the upper bound on the resolution increase of the optical system under consideration.

Equation (4) can be obtained from $$r_0 = 0.185 \left(\frac{\lambda^2}{\int_0^z c_n^2(\xi) d\xi}\right)^{\frac{3}{5}}, \qquad (5)$$

where the term in the denominator is the integral of the atmospheric structure constant along the optical path [0, z].

In order to attain an increase in resolution approaching the limits given by equation (3), the effects of atmospheric turbulence must be deconvolved from the aberrated image. FIG. 1 shows the effects of simulated atmospheric turbulence for a target that is 1.3 km away from the optical imaging system. The center wavelength was 550 nm and the distance between the simulated object and the 8-inch telescopic imaging system was 1.3 km. The Fried coherence length was 2 cm. The imaging system itself was assumed to be noise-free to isolate and demonstrate the atmospheric turbulence effects on the resulting image.

FIG. 2 shows the simulated diffraction-limited, atmospheric-turbulence-compensated image from the same imaging system. Notice the dramatic increase in spatial resolution possible by compensating for the effects of atmospheric turbulence. From FIG. 1, it can be seen that even if a "perfect" (aberration-free) imaging system could be built (for example, no optical system aberrations), the presence of atmospheric turbulence still severely degrades the imaging system's performance in terms of achievable spatial resolution and that compensating or correcting for the effects of atmospheric turbulence can significantly improve the overall image quality.

For comparisons to real data results, FIG. 3 shows actual imagery taken under imaging conditions similar to those that were used to generate the simulated images above. The data in FIG. 3 was taken by Dr. C. J. Carrano from Lawrence Livermore National Labs (LLNL) using a very promising speckle imaging-based methodology [2]. Dr. Carrano implements her turbulence-compensation method on a Field Programmable Gated Array (FPGA) technology and the image-processing time of her method is expected to perform near real-time [3,4]. Note the similarity in image quality between the simulated and real-image data. The process of removing atmospheric turbulence from images is called deconvolution.

There are three basic ways to estimate and remove the effects of atmospheric turbulence, namely, 1) adaptive optics systems, 2) post-processing atmospheric turbulence compensation systems, and 3) hybrid systems.

Adaptive optics systems are hardware-based systems that can correct atmospheric-turbulence effects in real-time (faster than 30 Hz). Adaptive optics systems are generally cumbersome, require extensive hardware, alignment, and expertise, and are expensive. They are also predominantly designed for fixed sites and aren't typically man-portable, rugged, or covert.

Post-processing atmospheric turbulence compensation systems are largely implemented in software (software dominant) but traditionally are very slow (not real-time). Hybrid methods are a cross between the two and generally relax some of the hardware processing requirements and then correct for the loss in performance using post-processing methods.

Many of the existing software-dominant deconvolution approaches such as wavelength diversity, phase diversity, multi-frame blind deconvolution and other post-processing approaches have been predominantly focused on phase-only corrections (near-field turbulence approximation) and have been iterative and slow[5,6,7]. Some notable exceptions are Paxman's use of phase diversity for reconstructing the unaberrated object brightness through distributed turbulence, Aubailly and Vorontsov's methods for fusing segments of "lucky" image frames to de-blur images obtained over horizontal optical paths, and more recently the work of Carrano which generalized the traditional speckle-imaging technique that is and has been used to great effect in astronomy and other near-field turbulence application areas [3,4,8,9]. The approach of Ortiz and Carrano et al. improves the speed of the traditional speckle imaging-based post-processing Methods. For this reason a quick overview of Carrano's method is provided along with some relevant comparisons and observations.

Carrano's approach parameterized the Korff transfer function in terms of the atmospheric coherence length, $r_o$ to estimate the object magnitude and used the bi-spectrum technique to estimate the object phase without requiring the presence of a reference source such as a star or laser guide-star [10]. The approach was applied to a horizontal path turbulence scenario with excellent results for optical path lengths of 0.5 km to 10 km. Processing was done on a 256 by 256 pixel by 100 image frame data cube using a 1.7 GHz Pentium IV processor. It originally took about 10 seconds to process this data cube, which represented an isoplanatic patch from a 1280 by 1024 image. To recover the full image, 20 similar data cubes must be processed resulting in 200 seconds of processing time for their non-optimized algorithm. In subsequent papers, Ortiz, Carrano et al. have continued to improve processing times to approximately 1 second using faster processing capabilities [3,4]. When considering real-time atmospheric turbulence compensating systems that work with uncooperative targets (for example, in some surveillance applications), a distinct limitation of the Carrano approach is that it could require hundreds of images or more to provide the parameters needed for their method to work. It would be advantageous to require just one pair of simultaneously-captured images given sufficient signal-to-noise to form the image pair (for example, enough signal to capture the blurry pair of images).

The following is an overview of the optical-systems model used in general-purpose incoherent optical imaging systems. This will provide a common basis of understanding when comparing alternative imaging methodologies and will provide the necessary background to understand the approach of the present invention.

For many incoherent imaging applications, a linear, shift-invariant imaging model is appropriate. For this case, the optical systems model is given by [11], $$i(\vec{x}) = o(\vec{x}) * |h_i(\vec{x})|^2, \quad (6)$$

where $o(\vec{x})$ the 2-D pristine object brightness function, $|h_i(\vec{x})|^2$ is the imaging system's point spread function (PSF), $i(\vec{x})$ is the "blurry" image due to atmosphere and optical imaging system effects, and $\vec{x}$ is a 2-D position vector in the image plane. The asterisk represents 2-D spatial convolution.

FIG. 4 shows the general relationship among the quantities of interest in the incoherent imaging scenario in a general-purpose optical systems model. By taking the 2-D Fourier transform of both sides of equation (6), the frequency-space equivalent of equation (6) is given by $$I(\vec{f}) = O(\vec{f}) H(\vec{f}), \quad (7)$$

where $I(\vec{f})$ is the image spectrum, $O(\vec{f})$ is the object spectrum, $H(\vec{f})$ is the optical transfer function (OTF) and $\vec{f}$ is a 2-D spatial frequency variable. Equations (6) and (7) apply at each spatial coordinate $\vec{x}$ and at each spatial frequency $\vec{f}$.

The PSF can be related to the optical transfer function by, $$H(\vec{f}) = \frac{\Im\left[|h_i(\vec{x})|^2\right]}{\Im\left[|h_i(\vec{x})|^2\right]_{\vec{f}=0}}, \quad (8)$$

where the symbol, $\Im[\cdot]$, denotes taking the 2-D Fourier transform of the expression inside the brackets. The optical transfer function is seen to be the 2-D Fourier transform of the PSF and then normalized so that the maximum value of the OTF is 1.

The relationship between the optical system's impulse response $h_t(\vec{x})$ and the generalized pupil function (GPF) is given by, $$h_t(\vec{x}) = \mathfrak{S}^{-1}[W(\vec{x})], \qquad (9)$$

where $\mathfrak{S}^{-1}[\bullet]$ represents taking the 2-D inverse Fourier transform of the expression inside the brackets, and $$W(\vec{x}) = A(\vec{x})e^{j\phi(\vec{x})}, \qquad (10)$$

is the generalized pupil function (GPF). The function $A(\vec{x})$ is an aperture function that has a value of 1 inside the clear aperture of the telescope and 0 outside of it. The function $\phi(\vec{x})$ is the atmospherically-induced phase aberration realized at spatial coordinate $\vec{x}$ in the entrance pupil of the imaging system. In the near-field turbulence approximation model, such as if one is looking up through the atmosphere into space from a ground-based telescope, the amplitude variations are assumed negligible within an isoplanatic patch, and are set to 1.

In traditional "diversity-based" post-processing atmospheric turbulence compensation methods, the basic idea is to insert a known diversity into the imaging system by some artifice and then simultaneously capture the original image and the diversity image. The OTFs of the aberrated image and the diversity image are related to each other and a suitable error metric is used to select the OTF that produces the lowest local and global error. Depending on the approach taken, in relating the OTF to the diversity OTF, often the resulting error metric will be a function of the aberrated image spectrum, the diversity image spectrum (both measured) and analytical expressions of the OTF and diversity OTF that are both functions of entrance pupil phase estimates or phase difference estimates. For instance, the popular phase-diversity post-processing atmospheric turbulence compensation method uses an additive phase term that is known a priori in the expression of the phase diversity generalized pupil function, $$W_{pd}(\vec{x}) = A(\vec{x})e^{j(\phi(\vec{x})+\phi_{pd}(\vec{x}))}, \qquad (11)$$

where the subscript pd denotes the phase diversity method was used. The expression $W_{pd}(\vec{x})$ is the phase diversity generalized pupil function and, as shown, has a known phase diversity $\phi_{pd}(\vec{x})$ added to the unknown atmospheric turbulence phase $\phi(\vec{x})$ at every entrance pupil spatial coordinate $\vec{x}$. Often a known quadratic phase factor can be introduced in the phase diversity image by slightly defocusing the diversity image.

Another diversity method is one by which an image is captured simultaneously at two different narrow-band wavelengths centered at $\lambda_1$ and $\lambda_2$. The wavelength diversity generalized pupil function is then given by $$W_{wd}(\vec{x}) = A(\vec{x})e^{j\left(\frac{\lambda_1}{\lambda_2}\phi(\vec{x})\right)}. \qquad (12)$$

In the traditional diversity-based atmospheric turbulence compensation methods, a diversity OTF is generated by using equations (8) through (10) in reverse order and substituting the appropriate diversity generalized pupil function from equation (11) or (12) depending on which diversity method one is using for equation (10). A common error metric such as the Gonsalvez error metric [12,13], $$E(\vec{f}) = \frac{|I(\vec{f})\hat{H}_d(\vec{f}) - I_d(\vec{f})\hat{H}(\vec{f})|^2}{|\hat{H}(\vec{f})|^2 + |\hat{H}_d(\vec{f})|^2} \qquad (13)$$

can then be applied at every point in the image spectrum as a means to determine when the OTF estimate is accurate enough. Note that the carat symbol ^ above the OTF and diversity OTF indicate that these quantities are estimated. In traditional diversity-based atmospheric turbulence compensation methods, the process for estimating the OTF (and also the diversity OTF by analogy) includes 1. Using a suitable basis set like the Zernike polynomials initially to generate an entrance pupil plane-phase estimate. This is done by just initially guessing the phase—for example, that all phase values are zero;
2. Forming the generalized pupil function with this entrance pupil phase "guess" using equation (10). Note: use equations (11) or (12) for estimating the diversity OTF;
3. Zero-packing the GPF for sampling reasons in preparation of generating an OTF estimate;
4. Forming the impulse response in accordance with equation (9);
5. Determining the PSF estimate by point-wise taking the magnitude squared of the result of step 4 above;
6. Using equation (8) to form the OTF estimate;
7. After forming both the OTF and diversity OTF estimate, applying an error metric such as the Gonsalvez error metric given in equation (13) and possibly some constraints to determine the instantaneous error at each spatial location in the OTF;
8. Summing the errors to determine the total summed error due to the initial entrance pupil plane phase estimation error;
9. Changing the weights on the Zernike polynomials in a methodical manner to come up with a new entrance pupil plane phase estimate;
10. Repeating steps 2 through 8 to generate a new error estimate;
11. Comparing the new error estimate to the old estimate and keeping the phase estimates associated with the lowest error; and
12. Continuing to execute steps 10 and 11 until the error is minimized and the best OTF estimate is obtained.

Once the error-minimized OTF estimate is obtained, a Wiener filter can be generated that removes the effect of atmospheric turbulence. Notice that the OTF itself is generated by phase estimates that are due to 1) atmospheric turbulence effects, and 2) aperture effects (for example, diffraction effects). If the effects of the atmospheric turbulence are mitigated by filtering them out using the Wiener filter, then the only remaining effect is that due to diffraction, and so the diffraction-limited result is obtained. To attempt to remove the effects of the aperture, super-resolution methods need to be employed.

After the error-minimized OTF estimate is determined, the Wiener filter is given by $$H^{-1}(\vec{f}) = \frac{H^*(\vec{f})}{\left(|H(\vec{f})|^2 + \alpha\right)}, \qquad (14)$$

where the asterisk on the right side of equation (14) represents complex conjugation. Care must be taken for the case where the denominator of equation (14) approaches zero. A parameter α based on system noise is sometimes included in the denominator to prevent equation (14) from blowing up as $H(\vec{f})$ approaches zero. As can be seen from equation (7), multiplying the image spectrum by the Wiener filter leads to an unaberrated object spectrum, $$O(\vec{f}) = I(\vec{f}) H^{-1}(\vec{f}), \tag{15}$$

and the atmospheric turbulence free object brightness estimate is simply obtained by taking the 2-D inverse Fourier transform of equation (15).

Notice also that equation (8) can be directly determined from the GPF in the following manner, $$H(\vec{f}) = \frac{W(\vec{x}) \otimes W(\vec{x})}{W(0) \otimes W(0)}. \tag{16}$$

The symbol ⊗ means auto-correlation and the entrance pupil spatial position variable is related to the spatial frequency variable by $$\vec{x} = \lambda d_i \vec{f}, \tag{17}$$

where $d_i$ is the distance from the imaging system's exit pupil to the focal plane and lambda is the center wavelength of the illuminating light. The denominator in equation (16) is just the area of the imaging system's entrance pupil (commonly the area of the telescope's collecting lens for well-designed optical systems).

In the past, due to limitations of processor speed and some computational inefficiencies inherent in the majority of traditional post-processing atmospheric turbulence compensation approaches, this direct methodology illustrated by equation (16) was considered from a practical point of view to be much slower than the iterative Fourier transform-based approach described in steps 1 through 12 above. What is needed is a new methodology that overcomes these inefficiencies and provides for a software-dominant approach for atmospheric turbulence compensation that can be accomplished in real-time. It would be beneficial to both significantly modify the traditional atmospheric turbulence compensation methodology and also use a general-purpose parallel-processing device such as a field-programmable gated array to achieve real-time processing speeds. Utilizing both steps would enable a system to achieve real-time processing in a practical and scalable manner.

BRIEF SUMMARY OF THE INVENTION

As discussed above, a number of methods exist for image compensation of atmospheric aberrations. These tend to be computational intensive, highly iterative, and slow. Some traditional techniques need many sequential images and have trouble with rapidly-changing backgrounds in the captured images. The method of the present invention uses image pairs captured simultaneously, so rapidly-changing backgrounds are not an issue. By using a modified correlation-based technique, many of the iterative 2-D FFT steps can be eliminated, reducing computational requirements. By taking advantage of processes that can be run in parallel and adapting error minimization to look-up tables, the computational processes can be further streamlined. Also, because of the redundancy of information in the OTF, a dramatic reduction in the number of necessary computations is achieved. Once the OTF is estimated, a conventional inverse Wiener filter can be devised to compensate for atmospheric aberrations and produce an aberration-free image estimate. Estimates of the number and kinds of computations required and data transfer rates demonstrate image-compensation capability near 30 Hz.

The present invention utilizes a modified diversity approach, such as wavelength diversity or phase diversity, using a new correlation-based technique. This approach does not require iterative 2-D Fourier transforms to determine the optical transfer function, facilitates direct estimation of the pupil plane phases, and is easily implemented in a parallel computational architecture. Taking advantage of parallel computing methods, this modified diversity-imaging technique provides potentially real-time results that can be largely implemented in software.

The present invention provides a means to compensate for atmospheric turbulence in imagery with optical path lengths of up to 5 km. The approach includes a turbulence compensation algorithm on general-purpose parallel-processing (GPPP) hardware that provides for real-time (faster than 30 Hz) turbulence-compensated imagery using currently-available commercial-off-the-shelf (COTS) technology. This turbulence compensation approach can be implemented on a laptop computer with the GPPP on a Personal Computer Memory Card International Association (PCMCIA) Express Card and retro-fitted to existing imaging systems. The turbulence compensation method is capable of increasing the resolution of the imaging system by a factor of up to 22 for an 8-inch diameter telescopic imaging system operating in the visible wavelengths. The system, excluding the camera, telescope, or camera lenses, consists of software, the lap-top computer, the GPPP on the PCMCIA Express card, and user interface software. The size and weight of the hardware will be no larger or heavier than a standard laptop computer.

The phase diversity technique has been adapted to run in parallel mode. This allows the parallel phase diversity atmospheric turbulence compensation method to be implementable on general purpose parallel computing architectures A systems engineering approach has been used to provide backwards compatibility with conventional phase diversity implementations on sequential digital signal processing computing platforms. This approach provides for a modular design and compatibility with existing telescopic-based imaging systems.

The parallel phase diversity method has been optimized to be efficiently implementable in distributed processing environments.

A multi-diversity feature has been included to overcome regions of insensitivity in the traditional phase diversity approach and to provide an alternate, direct-phase estimation methodology that doesn't require the traditional iterative 2-D Fourier Transform methods.

According to an aspect of the invention, an imaging method providing atmospheric turbulence compensation includes capturing a subject image pair. Data corresponding to the captured subject image pair is loaded into memory associated with a parallel processing device. A 2-D Fast Fourier Transform is performed on the stored image data and the resulting transformed image data is then stored. An optical transfer function estimate is developed from the transformed image data and a suitable error metric. The optical transfer function estimate is then inverted and used to generate a Wiener filter function that implements an inverse optical transfer function. The Wiener filter function is then applied to the transformed image data to estimate an atmospheric turbulence compensated image spectrum, which is applied to the transformed image data to produce corrected image spectrum data. A 2-D Inverse Fast Fourier Transform is then applied to the aberration-free image spectrum data to generate corrected image data that is compensated for atmospheric aberrations. The transformed corrected data is stored.

The inverse of the optical transfer function can be embodied, for example, in a Wiener filter function.

Capturing the subject image pair can include simultaneously capturing two images of a target. For example, the two images can be captured at respective different wavelengths. Alternatively, the two images can be captured at the same wavelength with a known phase offset.

Capturing the subject image pair can include collecting sample points of each image at the entrance pupil plane of an image capture device (for example, the collecting aperture of a telescope). Developing the optical transfer function estimate can include using a current value of the optical transfer function, along with the transformed image data and a suitable error metric to determine an entrance pupil phase or phase difference estimate. Developing the optical transfer function can also include evaluating the optical transfer function at discrete locations to determine entrance pupil phase differences, and stitching together the entrance pupil phase differences to determine an entrance pupil phase function. Developing the optical transfer function can also include estimating the optical transfer function based on an autocorrelation of a generalized pupil function of the image capture device. Autocorrelation of a generalized pupil function of the image capture device can include determining a function of summations of complex exponential phase differences resulting from the autocorrelation of the generalized pupil function. The complex exponential phase differences can be, for example, single-term optical transfer function solutions. The method can also include determining a plurality of summations of a sequential number of complex exponential phase differences. In this case, individual terms of the plurality of summations and the single-term optical transfer function solutions can be sequentially combined to develop the optical transfer function estimate. Developing the optical transfer function estimate can also include utilizing potential phase difference solutions stored in one or more look-up tables.

The method can also include determining a region of interest within the captured image pair.

BRIEF DESCRIPTION OF THE DRAWINGS

FIG. 8a shows exemplary instantaneous steps in the autocorrelation of a 5×5 matrix.

FIG. 8b shows the first non-zero un-normalized OTF point, $C_{1,5}$, from complex exponential phase differences resulting from the autocorrelation of the GPF matrix.

FIG. 9b. is an exemplary expanded filter block diagram.

FIG. 10 is a chart showing exemplary timing estimates for using a Xilinx XC5VSX95T.

DETAILED DESCRIPTION OF THE INVENTION

Figure 1:
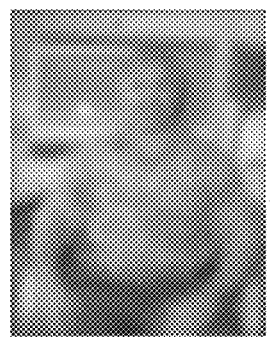
FIG. 1 is a simulated image showing atmospheric turbulence effects.
Figure 2:
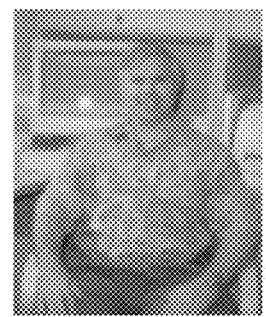
FIG. 2 is a simulated image of an atmospheric-turbulence-compensated image.
Figure 3:
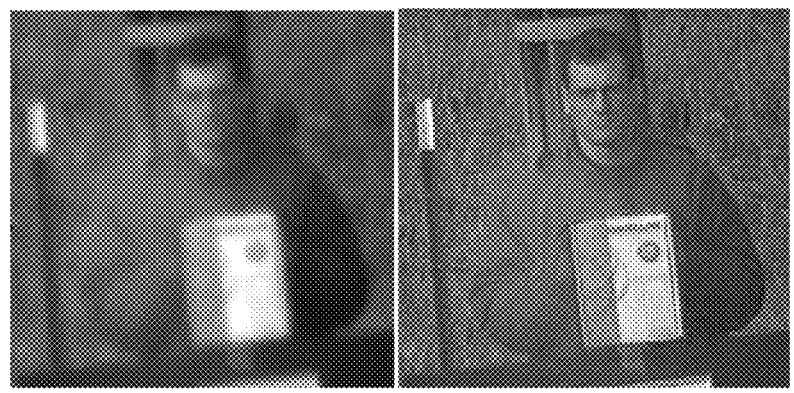
FIG. 3 shows real data of an atmospheric-turbulence-compensated image.
Figure 4:
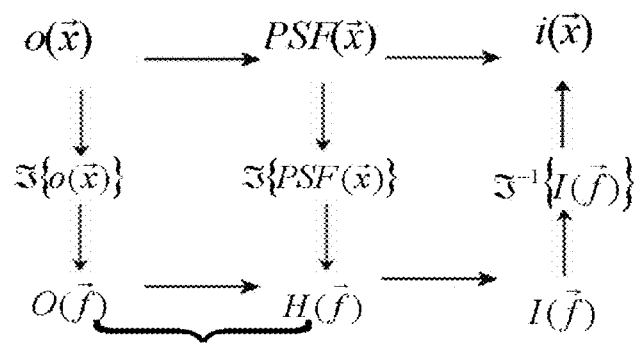
FIG. 4 shows an exemplary general-purpose optical systems model for incoherent imaging.

The present invention is a system and methodology used to provide real-time, software-dominant, non-iterative atmospheric turbulence compensation based on a modified traditional "diversity" technique and the use of a general-purpose parallel-processing (GPPP) device. Components can be commercial-off-the-shelf (COTS) components and design options are provided for generalizing the approach to any camera or video system. In essence, the required hardware includes a camera lens or telescope for image magnification, a multi-spectral camera (commercially available) or a special lens adaptor designed to integrate with the camera for general purpose digital cameras or digital video recorders, and a laptop computer fitted with a PCMCIA form-factored GPPP such as the Xilinx XC5VSX95T. Note that this GPPP is representative only and alternative GPPPs can be used if desired.

When looking at the steps required in many traditional diversity-based atmospheric turbulence compensation methods presented above, some immediate problems with overall accuracy and speed come to mind. These issues can be summarized as deficiencies related to fitting error, and those related to embedded computational complexity.

For example, in the first step of the 12-step traditional atmospheric turbulence compensation approach discussed above, the use of a weighted basis function such as the Zernike basis function to describe the entrance pupil phase aberrations leads to a "fitting error," because the true phase map is being approximated by a truncated sequence of weighted Zernike polynomials. For traditional post-processing methods, this was a necessary evil since directly evaluating the entrance pupil plane phase in addition to using the iterative, computationally-intense, turbulence-compensation algorithms was prohibitive on conventional single-processor computational platforms.

The method of the present invention directly determines the entrance pupil plane phases through an intelligent combination of phase-difference results using software methodology and readily-available GPPP technology. The entrance pupil plane phase is not approximated as in the traditional diversity methods, but rather the entrance pupil phase differences (and subsequently the entrance pupil phases themselves through a phase-stitching approach) are directly determined, and so the inventive method does not suffer from this type of fitting error.

Further, steps two through ten in the traditional diversity-based atmospheric turbulence compensation method discussed above are extremely computationally intensive in that they require two 2-D Fourier transforms, a point-wise magnitude squared, a divide by a constant, and the computation of local and global error metrics at the center of an iterative loop.

These computations are repeated for each incremental adjustment in the iterative loop and the loop can have hundreds to thousands of iterations.

In modifying the traditional diversity-based atmospheric turbulence compensation approach, the present invention uses an alternative, parallel-processing method that does not require the 2-D Fourier transform methodology outlined previously. In so doing, the requirement for the repetitive computations of the complex, time-intensive functions at the core of the iteration process is eliminated. Further, the need for the iterations themselves is removed by implementing the iterative calculations using look-up tables and parallel-processing technology. These two aspects reduce the computational complexity and provide for a dramatic speed boost, enabling real-time diversity-based atmospheric turbulence compensation.

Figure 5:
FIG. 5 shows an exemplary basic apparatus configuration.

An exemplary configuration for the setup of the system apparatus is shown in FIG. 5. In this embodiment, a multi-spectral camera can be attached to a small field telescope. An example of an appropriate multi-spectral camera is the commercially available FD-1665 3 CCD camera manufactured by FluxData, Inc. Images in the camera can be captured simultaneously at two different wavelengths using a narrowband multispectral camera or a specially-adapted lens assembly with a generic digital camera or digital video recorder. The captured images are then collected by the portable laptop computer for atmospheric turbulence compensation.

Figure 6:
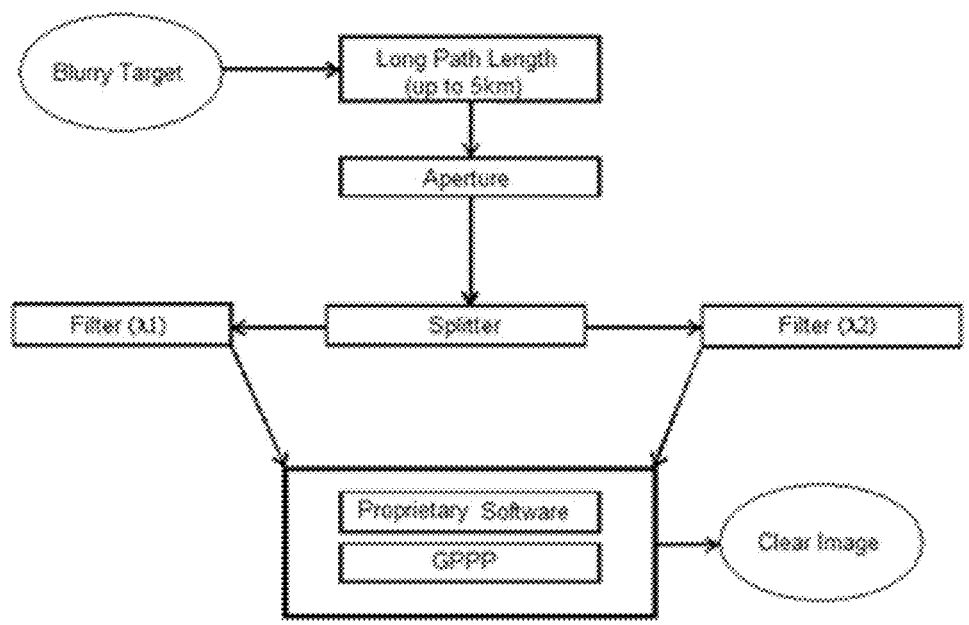
FIG. 6 shows an exemplary simplified imaging process.

When using atmospheric turbulence compensation techniques that require iterative image captures, a rapidly-changing background can present a problem. Because the inventive technique captures the image at both wavelengths simultaneously and only requires a single set of images given a sufficient signal-to-noise ratio to capture the images on the camera, a rapidly-changing background is not an issue for this method. FIG. 6 shows the basic process for the atmospheric turbulence compensation scenario. Notice that the imaging scenario is relatively close range (up to 5 kin).

This method also works for long distance (greater than 10 miles) ground-to-air applications. The required input data is a pair of simultaneously-captured images at two different wavelengths (for wavelength diversity) or two images at the same wavelength with a known phase offset (phase diversity). Implementing the methodology on a GPPP removes the atmospheric turbulence, resulting in the clear image (atmospheric turbulence compensated image) indicated at the bottom right of FIG. 6.

In order to avoid aliasing, sufficient sample points need to be collected across the entrance pupil plane (collecting aperture of the telescope). If the image is band-limited and has significant value only over a finite region of the sampled entrance pupil plane, it is possible to reconstruct the object brightness with good accuracy using a finite number of samples. If the object spectrum lies within the region of the entrance pupil bounded by $$-L_x \leq x \leq L_x \text{ and } -L_y \leq y \leq L_y \quad (18)$$

and is sampled in accordance with the Whittaker-Shannon sampling theorem on a rectangular lattice, the total number of sampled points required is known to be $$M = 16 L_x L_y B_x B_y, \quad (19)$$

where $L_x$ and $L_y$ are the dimensions of the aperture, M is the number of sample points, and $B_x$ and $B_y$ are the spatial frequency resolution requirements to avoid aliasing.

Since the various sampled points in the image spectrum are separated by the distances l/x and l/y in the $f_x$ and $f_y$ directions, separation of the spectral regions must then be $$x \leq (2B_x)^{-1} \text{ and } y \leq (2B_y)^{-1} \quad (20)$$

Figure 7:
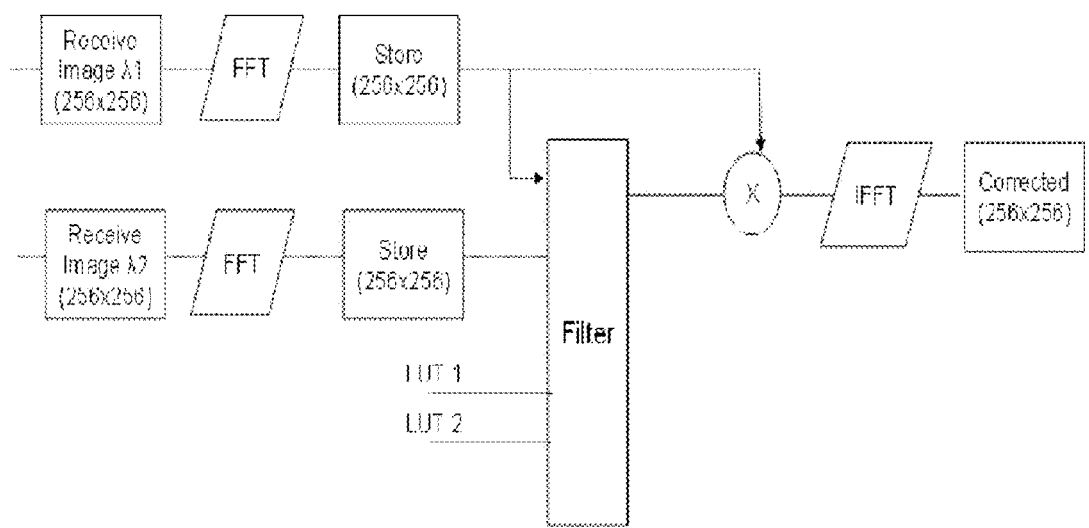
FIG. 7 shows an exemplary simplified signal processing diagram.

The images at both wavelengths are sampled and sent to the laptop. The laptop performs a 2-D fast Fourier transform (2-D FFT) and stores the images as shown in FIG. 7, the basic signal-processing block diagram.

Note that a 256 by 256 image segment is shown. This is not a limitation of the method but rather is shown in this way for consistency with other work such as Carrano's [2]. Inputs from both wavelengths of the image spectrum are loaded into the filter shown in FIG. 7 to develop an inverse Wiener filter. Applying the developed inverse Wiener filter to the image spectrum allows turbulence correction for aberrations in the image spectrum. The corrected object spectrum then has a 2-D inverse Fast Fourier Transform (IFFT) applied and the unaberrated object brightness is then determined.

It is with the development of the steps up to the inverse Wiener filter given by equation (14) that the inventive method departs from traditional atmospheric turbulence compensation methods. Traditional techniques use iterative and time-consuming estimates of the entrance pupil plane phase function to develop OTF estimates that require frequent 2-D FFT applications. The inventive method instead uses a correlation-based approach. Referring to equation (16), the OTF can also be estimated from the autocorrelation of the generalized pupil function (GPF). Equation (10), the generalized pupil function, is such that it has a magnitude and phase distribution representing aberrations due to atmospheric turbulence. The OTF can then be formed by applying equation (10), the generalized pupil function, to the autocorrelation equation (16). The OTF is then a function of summations of complex exponential phase differences resulting from the autocorrelation of the GPF.

Typically, on single-processor machines, this autocorrelation approach is not computationally effective as compared to the traditional Fourier transform approach outlined above in steps 1 through 12. However, there are certain points to be noted, as follows.

1. The OTF itself is full of redundant phase-difference information that can be selectively used to determine entrance pupil plane phase differences instead of the other way around (using entrance pupil plane phase differences to determine the OTF). This means that based on a given aperture, which is known a priori for any given imaging system, only a select number of OTF points need to be evaluated to completely map out the entrance pupil phase function. This reverse process (for example, using the OTF to determine the entrance pupil phases instead of the other way around) is one of the distinguishing features of the inventive method and substantially reduces the required number of computations required in using equation (16) to determine the full OTF. In essence, equation (16) is selectively evaluated at discrete OTF point locations in combination with an error metric like equation (13) to determine entrance pupil phase differences in such a fashion that the phase differences can be stitched together to provide the entrance pupil phase function. Since the OTF is full of redundant phase difference information, only a limited number of OTF points need to be evaluated and these points can be pre-determined for any given imaging system.

2. By using the modified correlation-based approach discussed in step 1 above, the computationally-intensive iterative Fourier transform-based approach that is central to the traditional diversity-based atmospheric turbulence compensating methods discussed in steps 1) through 12) above are avoided.

3. Each OTF point consists of sums of complex exponentials (based on equations (10) and (16)) that are themselves functions of the entrance pupil plane phase differences. This is readily understood when one recalls that the autocorrelation function can be manually evaluated at each point by a) taking the complex conjugate of the function to be auto-correlated (in this case the generalized pupil function), b) shifting the conjugated function spatially with respect to the original function, and c) summing the point products of the overlapping elements. The outermost points on the OTF only have one complex exponential that is a function of only one phase difference. This is shown in the example below. When this point is solved for the unknown phase difference by minimizing equation (13) or by analytically solving for the solution (only applicable for the single unknown phase difference case), this entrance pupil plane phase difference is uniquely determined for the given set of image spectrum values associated with our captured images. Notice that given sufficient GPPP resources (such as in distributed processing environments, technically viable, but not currently commercially available, high pixel density 3-D neural network chips, or multiple GPPP processing environments), the crescent of outer OTF single phase difference solutions can be determined analytically and simultaneously by using the GPPPs. Since often, this is not the case and only one GPPP is available for parallel computations, the power of the GPPP is reserved for the error minimization discussed below in step 5. It should be noted that even though only one GPPP is required for this method, each addition of a sequential processor (for example, CPU) and GPPP pair will have the effect of cutting the processing time in half over the single GPPP approach alone. These single phase difference solutions define the entrance pupil plane phase relationship between the phases themselves. That means that once we determine one of the entrance pupil plane phases themselves in the phase difference results, then the other entrance pupil plane phase is also known through the phase difference relationship.

4. Once the single phase difference OTF solutions are determined, the remaining unknown OTF points can be organized into sums of a sequential number of complex exponential phase differences (for example, sums of two complex exponential phase differences {two sum}; sums of three complex exponential phase differences {three sum}; sums of four complex exponential phase differences {four sum}, and so on). A fundamental observation of the inventive method is that in all cases, the single phase difference solutions can be combined with the two-sum equations (by using trigonometric identities) to reduce the number of unknown phase differences in the two-sum equations from two to one. The local error metric in equation (16) can then be minimized to find the unknown entrance pupil plane phase difference solutions. This effect cascades in general so that the two-sum results can be fed into the three-sum equations to reduce the three-sum equations to functions of one unknown phase difference. Likewise, the three-sum results can be used to reduce the four-sum equations to where they are only functions of one unknown phase difference. The goal then is to sequentially solve the OTF to progress from single phase difference results to two-sum results, to three-sum results and so forth and only select OTF point locations to solve that either a) provide brand new entrance pupil plane phase relationships that are unknown, or b) solve for phase difference relationships that helps link entrance pupil plane phase differences together. OTF points are selectively solved so that the entire entrance pupil plane is linked by phase differences so that if a single entrance pupil plane phase is determined, then the rest of the entrance pupil plane phases can be found from the linked phase difference solutions. For single-aperture systems, it is not necessary to know the actual entrance pupil plane phase, just the relative phase values and so one free guess is allowed. By guessing one of the entrance pupil plane phases, our linked entrance pupil plane phase difference relationships can be used to correctly determine the other relative entrance pupil plane phases. In essence, the entire entrance pupil plane phases can be "stitched" together in this fashion. The stitching pattern (that is, the particular order that the entrance pupil plane phase difference links are stitched together) is not unique and doesn't matter. It is only important that all the entrance pupil plane phase differences are linked with each other so that all the entrance pupil phases can be determined from one initial guess of the entrance pupil phase. It is not important how they are stitched together or in what order.

Figure 9A:
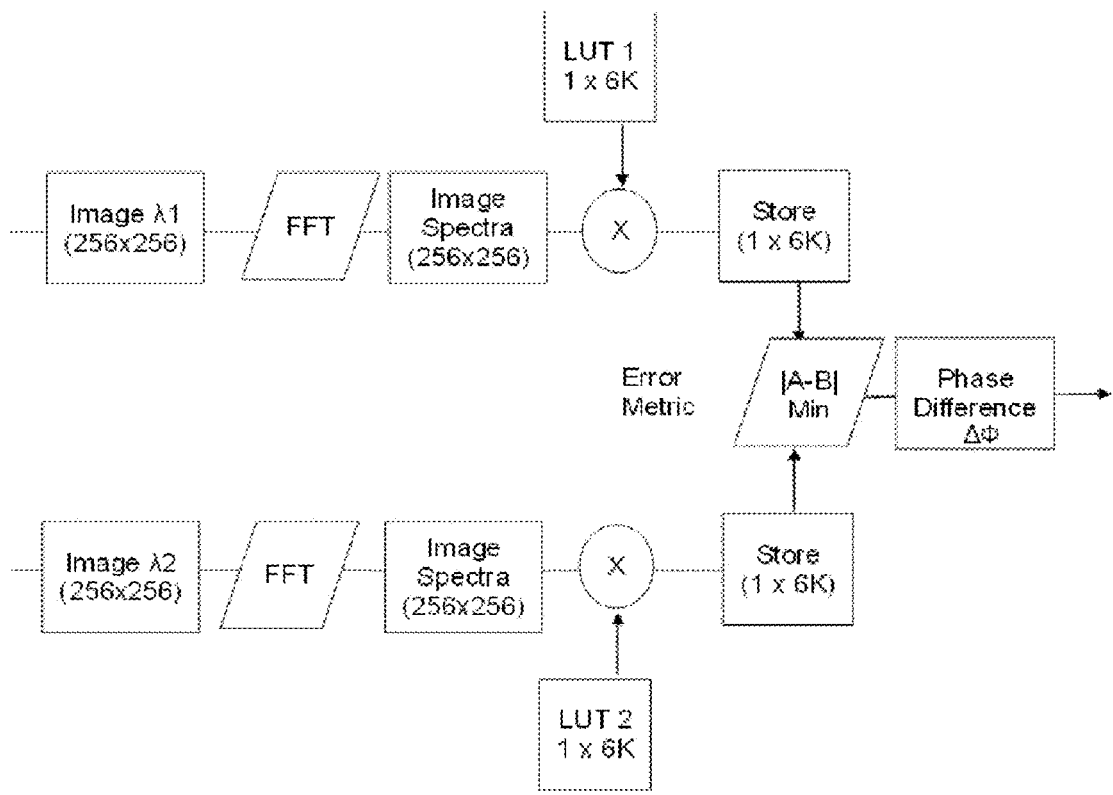
FIG. 9a is an exemplary expanded filter block diagram.

5. Even though a substantially smaller number of OTF points are selectively solved, a fast way to solve the error minimization equation at each OTF point given by equation (13) is needed. A GPPP can be used to non-iteratively solve the error metric given in equation (13). There are various ways that the GPPP can be used to non-iteratively solve equation (13). One way is to pre-store in a look-up table (LUT) all the potential phase difference solutions that occur in the iterative search space of the traditional diversity solutions. The phase differences that drive the OTF and diversity OTF estimates in equation (13) are sampled over the range (−pi, pi) using nominally 1000 samples. The GPPP is then used to simultaneously evaluate equation (13) for all possible phase differences and the phase difference that corresponds to the smallest error results in the phase difference solution for that OTF point. As stated previously in step 4), this phase difference solution is then passed to the next OTF point estimate to reduce the number of unknown phase differences to one. The GPPP is then used at the new OTF location to simultaneously determine all the error values at the new point and the phase difference solution corresponding to the minimum value of equation (13) is then determined at the new point. This process is continued until all the necessary entrance pupil phase differences have been determined according to 4) above. Another way that is computationally more efficient is to use two look-up tables based on the sampled phase differences previously mentioned. In this approach, as illustrated in FIG. 7 and FIG. 9a, the overall OTF phase (not the entrance pupil plane phase) is sampled and subsequently related to the entrance pupil plane phase difference values. In equation (13), the OTF terms to the left and right of the minus sign (numerator and denominator) are evaluated a priori for each possible sampled OTF phase difference and stored in two LUTs. The left OTF term divided by the denominator is stored in LUT1 and the right OTF term divided by the denominator is stored in LUT2. The GPPP can then be used to simultaneously solve equation (13) for any desired OTF point. Once again, the procedure in 4 above is used to determine which OTF points to solve. The dual LUT approach has the advantage of only requiring two complex number multiplications, a difference calculation, a magnitude calculation, and a minimization determination to solve for the correct unknown phase difference as opposed to directly determining each OTF element in equation (13) from complex exponential phase differences.

The combination of these steps results in the inventive non-iterative, parallel, diversity-based atmospheric turbulence compensation method that has the same or better spatial resolution performance than traditional diversity-based methods but can also be implemented in real-time. This methodology will also scale extremely well with the advent of faster-performing parallel processors and especially with high-density 3-D neural network chips when they become commercially available. It should be noted that stochastic methods currently under investigation have the potential to eliminate the necessity for sequentially solving the OTF points in step 4 above. The OTF locations are still determined based on "filling out" the entrance pupil plane via the entrance plane phase differences as outlined in step 4 above. However, unknown entrance pupil phase differences at each OTF location are stochastically and independently determined and subsequently adjusted and stitched together. A back-propagation approach is also under consideration that has the potential for eliminating the need for starting the solution process at the edge-points of the OTF (for example, those that have the single unknown phase difference solution points). An example follows.

A simple autocorrelation example is demonstrated below for a 5×5 matrix with an inscribed aperture. In order to perform an autocorrelation, the matrix is copied and complex conjugated and then the matrices are progressively moved across each other with the values at each step multiplied and summed together to form sums of complex exponentials at each point in the OTF matrix. Solutions are assigned to the spatial location that corresponds to the center of the shifted and complex-conjugated GPF (for example, center of upper left complex conjugated GPF in FIG. 8a). Empty circles represent zero values of the GPF outside of the aperture. Filled circles represent the GPF values at sampled points inside the aperture.

Figures 8A, 8B:
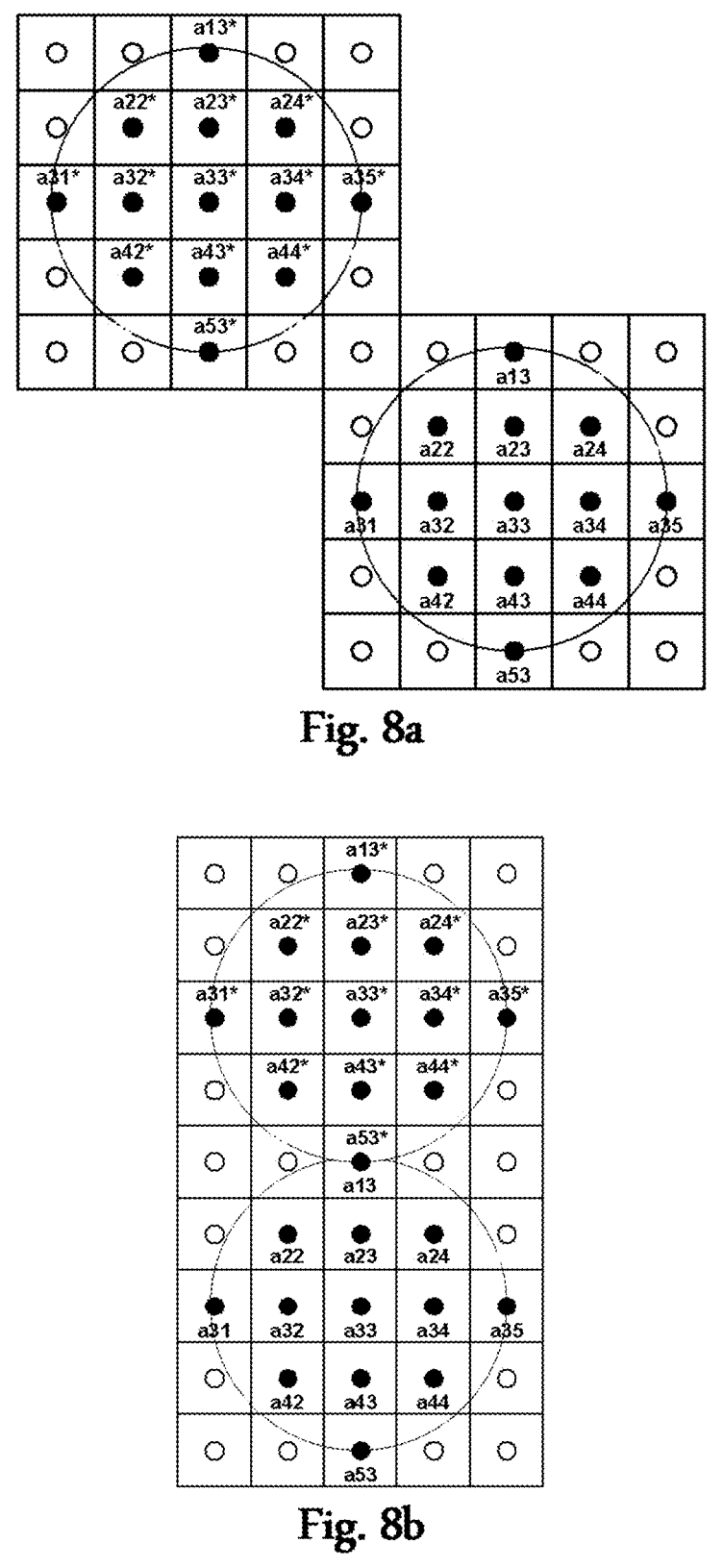
Figure 8C:
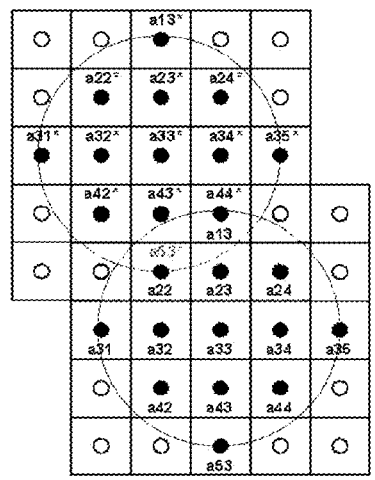
FIG. 8c shows the second non-zero phase difference in autocorrelation sequence, $C_{2,4}$.

It is not until the upper-most point of the GPF and lower-most points of the GPF conjugate overlap that the first non-zero phase difference develops as shown in FIG. 8b. The four previous overlaps between FIGS. 8a and 8b all have zero values. The overlap is $C_{1,5}$ in the OTF matrix and has the un-normalized value of $$C_{1,5} = e^{ja1,3} e^{-ja5,3} = e^{j(a1,3-a5,3)}, \quad (21)$$

which is a function of complex exponential phase differences from the points on the GPF itself. The matrices continue their progression with their next non-zero value being $C_{2,4}$, a function of the sum of two complex exponentials.

The un-normalized OTF matrix point $C_{2,4}$ has the value of $$C_{2,4} = e^{ja1,3} e^{-ja4,4} + e^{ja2,2} e^{-ja5,3} = e^{j(a1,3-a4,4)} + e^{j(a2,2-a5,3)} \quad (22)$$

Notice that equation (22) could be rewritten using trigonometric identities to be a function of $a_{1,3} +/- a_{5,3}$ and $a_{2,2} +/- a_{4,4}$ and that the transformed first term has the phase difference in it that was solved in the preceding step. By using equation (13), one can solve for the unknown entrance pupil phase difference $a_{2,2} - a_{4,4}$ and now have entrance pupil phase relationships between $a_{1,3}$ and $a_{5,3}$ and also $a_{2,2}$ and $a_{4,4}$. By using a later phase difference to link any of these phases together and guessing one of the phases, the rest of these phases are determined.

The autocorrelation will progress until all points of progressive overlap have been computed. An OTF formed in this fashion will have for an N×M GPF matrix a (2N−1)×(2M−1) OTF matrix.

FIG. 9 shows the expansion of the filter block illustrated in FIG. 7. Instead of iteratively searching through values to minimize an error metric, the inventive method implements the error minimization using Look-Up-Tables (LUT) 1 and 2 in a parallel scheme for a once-through pass as discussed above. This allows the parallel implementation of equation (13) to rapidly generate a solution at each OTF point.

The OTF matrix is much larger, (2M−1)×(2N−1), than the M×N GPF matrix, but is full of redundant information. A stitching algorithm as discussed in step 4 above has been developed that takes advantage of this redundant information in the OTF to dramatically reduce the required number of computations needed to produce the OTF. Implementation of this technique reduces not only the number of points that must be determined but also reduces the number of 2-D FFTs that need to be performed. Using parallel-processing hardware to take advantage of the Look-Up-Tables eliminates repetitive computational searches during error minimization as well. With the OTF matrix solved, an inverse Wiener filter can be developed and applied to the image spectrum from the first wavelength in accordance with equation (14). Applying this filter to the image spectrum and applying a 2-D Inverse Fast Fourier Transform to the filtered image spectrum will allow the recovery of the atmospheric turbulence compensated image. These final steps are identical to the traditional diversity-based methods and are shown in FIG. 9b.

A study of the computational performance is shown in FIG. 10. The study assumes an image (or image segment) size of 256×256 using a Xilinx XC5VSX95T FPGA as the GPPP. The study also includes data transfer times from the camera to the GPPP and from the GPPP to the laptop.

The timing estimate shown in FIG. 10 is broken into three major blocks. The first block includes transferring the data from the camera, developing the two wavelength's image spectra, and implementing the error metric against a reduced set of OTF points. The reduced set of points in the OTF is due to the application of the previously-discussed phase stitching approach. In the second major block, the phase map of the GPF is formed, the impulse response developed, and a 2-D FFT performed. Finally in the third block, the inverse Wiener filter is developed in accordance with equation (14). This filter is applied to the object spectrum to correct for aberrations, and a 2-D inverse fast Fourier transform (2-D IFFT) is used to correct the object spectrum to obtain an aberration-corrected image. Conservative timing estimates based on the numbers and types of calculations indicate that image corrections approaching 33 ms or better are achievable.

Thus, the invention modifies and blends multiple diversity-based atmospheric turbulence compensation methods to run on general-purpose, readily-available parallel-processing computing architectures to achieve real-time (greater than 30 Hz) turbulence-compensated imagery. Because the general-purpose parallel-processing architecture is flexible and adaptable, other image processing applications such as image fusion, edge-detection, image compression can be readily implemented using the same device.

Figure 11:
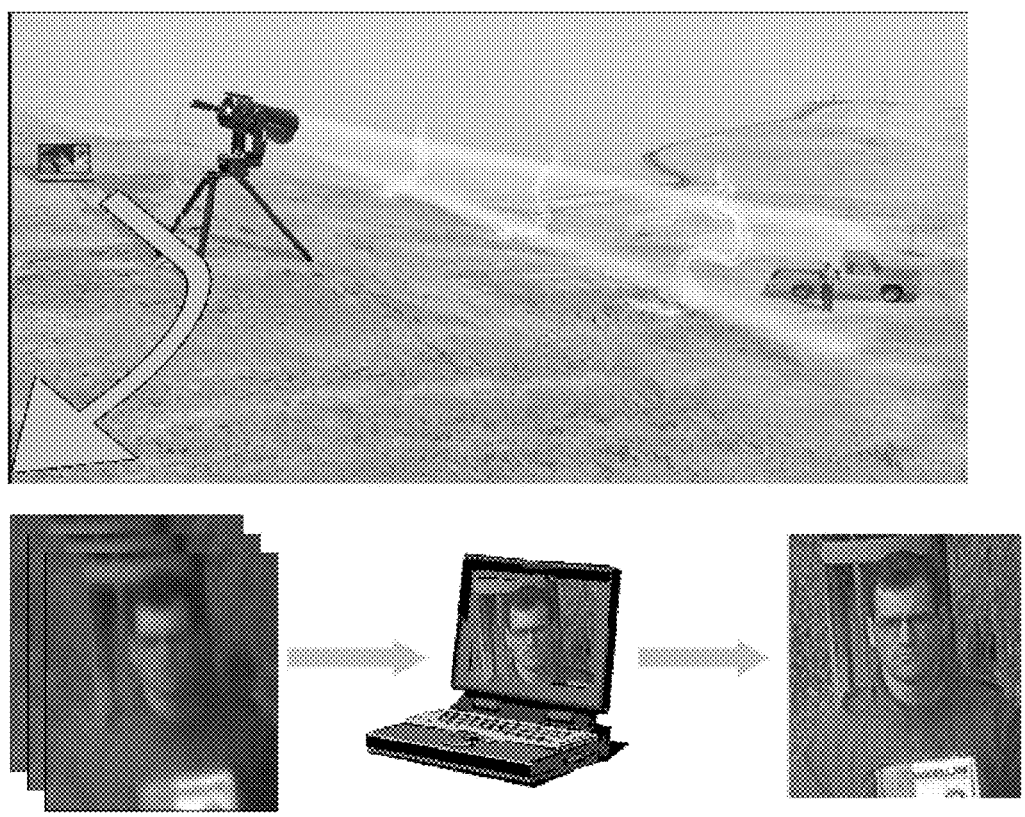
FIG. 11 shows an exemplary concept of operations for atmospheric turbulence compensation in surveillance mode.

The following is a description of the concept of operations regarding how the system is intended to be used. FIG. 11 shows the primary operational mode (mode A—surveillance mode), which is applicable for distances of less than 10 km.

There is also an operational mode B that is useful for early warning of remote objects (greater than 25 miles away) in a ground-to-air scenario. For brevity's sake, the following discussion will focus on operational mode A.

FIG. 11 shows the concept of operations for the approach according to the invention. A general-purpose telescopic imaging system views an object up to 10 km away. The target image is processed to remove the effects of atmospheric turbulence. The image sequence shown is actual data from a Lawrence Livermore National Laboratory-implemented atmospheric turbulence compensation method. Their method requires multiple images to be captured and processed, whereas the present invention can operate using a single, simultaneously-captured pair of diversity images. Additionally, the LLNL speckle-imaging method takes roughly 10 seconds to compensate a 256-by-256 pixel region on a conventional early model lap-top computer. The data shown is taken at a target distance of 1.3 km using an 8 inch telescope. The method of the present invention, using the modified multi-diversity approach, can do this in real time (faster than 30 Hz). The LLNL result is shown to a) describe the operational scenario for the inventive imaging method, b) show with real data the types of results that can be expected—the inventive method will have a similar improvement in spatial resolution, and c) point out the differences between the inventive approach and other existing atmospheric turbulence compensation methods.

Figure 12:
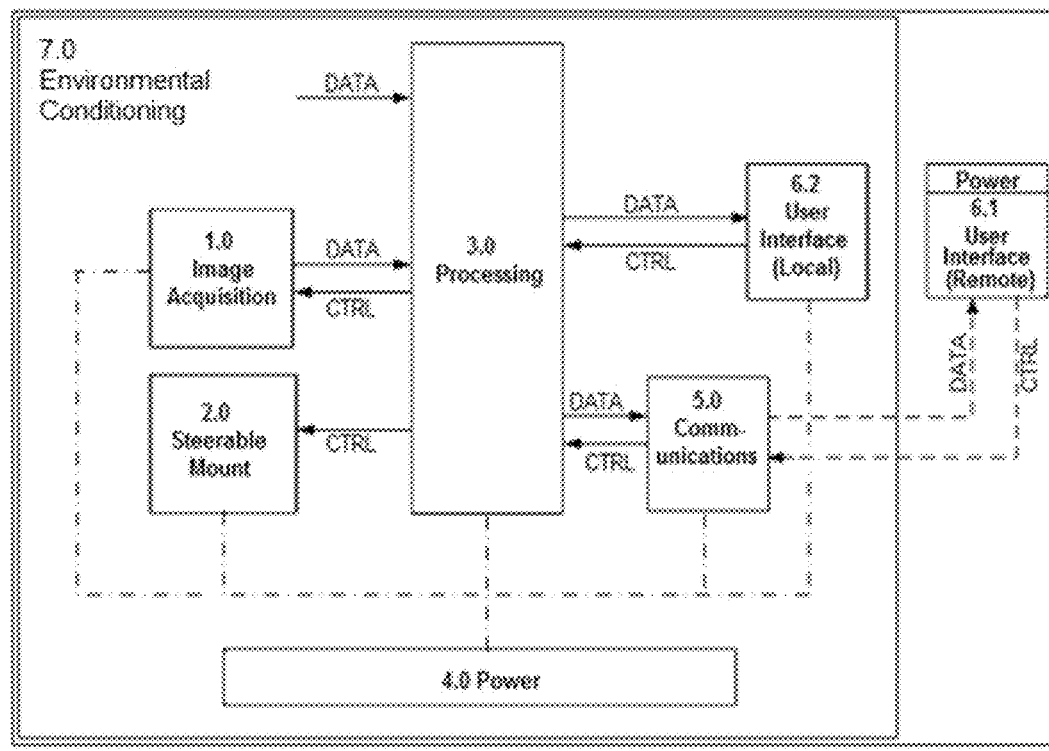
FIG. 12 is a block diagram of functional components for an exemplary atmospheric turbulence compensation system.

FIG. 12 illustrates the top-level functional components utilized for an exemplary parallel atmospheric turbulence compensating system. The functional block diagram shows the modular nature of the approach, with the left-to-right lines representing data flow and the right-to-left lines showing control signals.

The heart of the system is the processing block, which is described below. In conjunction with the top-level functional block diagram, an operational flow diagram describes the corresponding operational sequence that is used when implementing the inventive method. This operational sequence is shown in FIG. 13.

Figure 13:
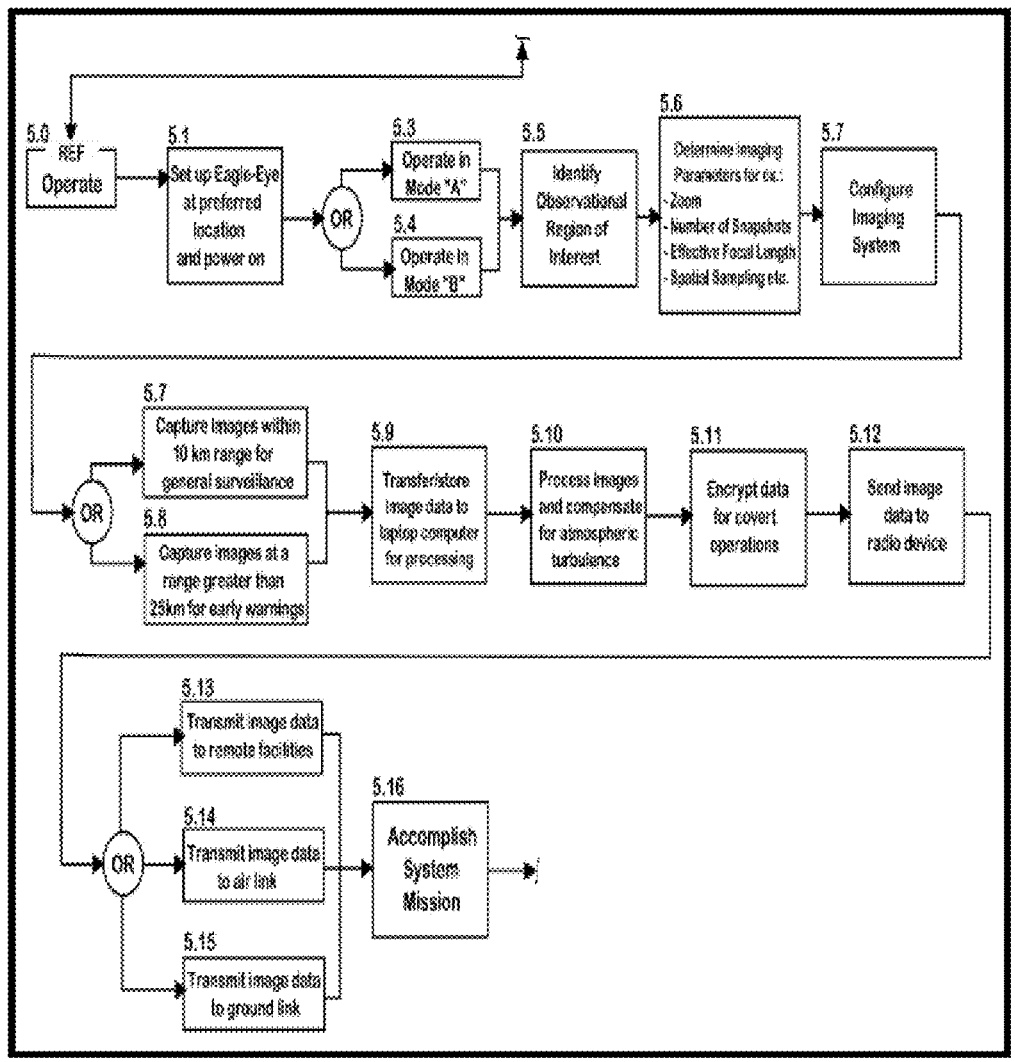
FIG. 13 is an operational flow diagram for an exemplary atmospheric turbulence compensation system.

In FIG. 13, Mode A refers to the surveillance mode (<10 km, ground-to-ground) and mode B refers to the early warning mode (>25 km, ground-to-air). Block 5.10 is the operational process that implements the atmospheric turbulence compensation. This block is expanded in FIG. 14.

Figure 14A:
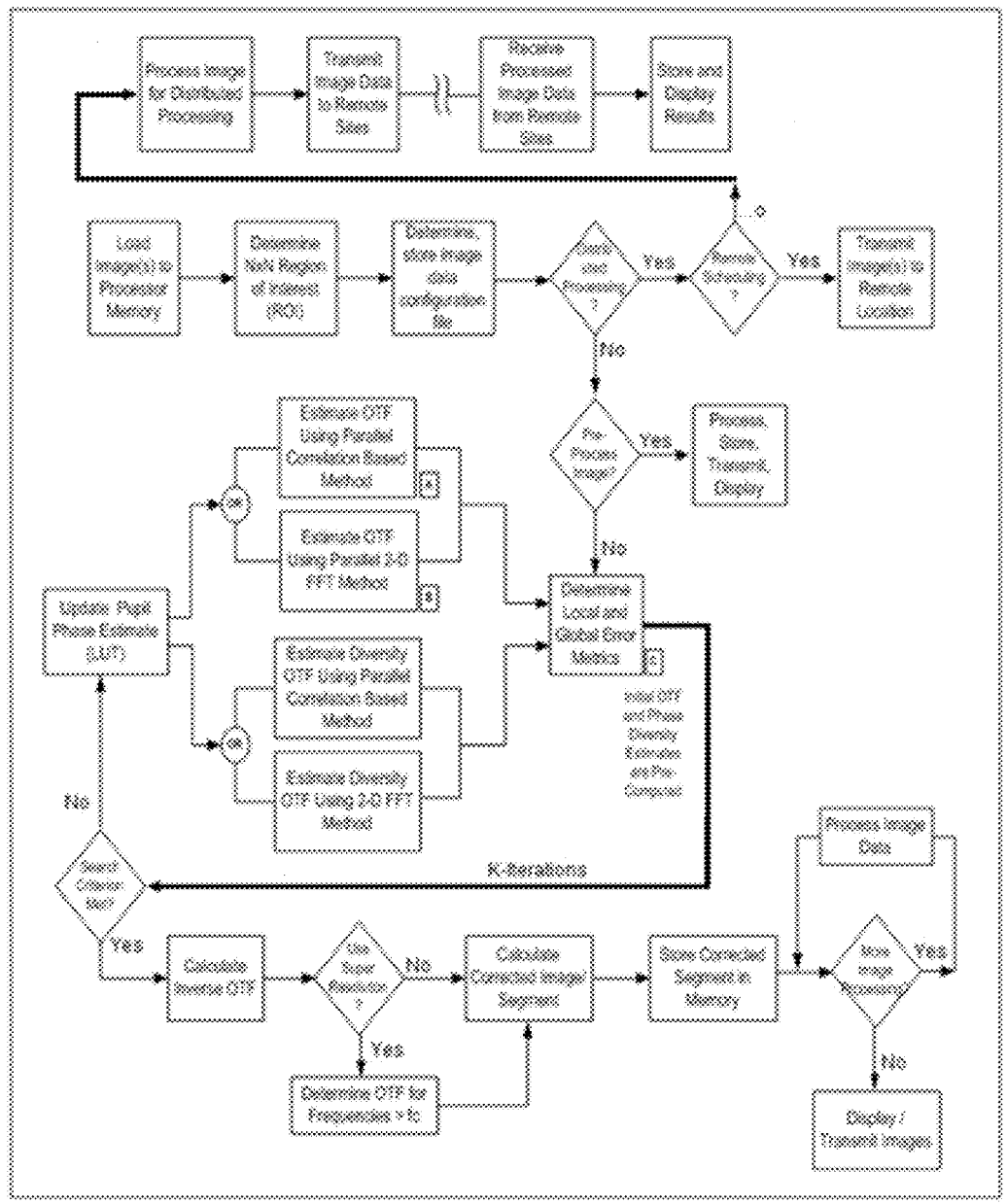
FIG. 14 is a flow diagram of an exemplary atmospheric turbulence compensation paradigm.
Figure 14B:
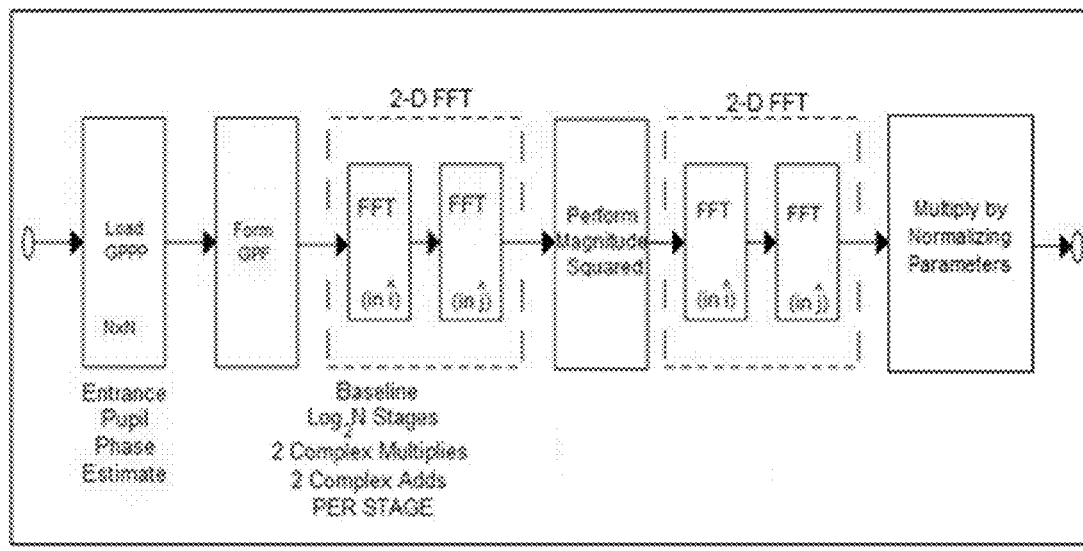

In FIG. 14, the blocks that contain "correlation-based method" indicate a proprietary multi-diversity, direct phase estimation approach that is semi-parallel and uses local diversity-based error metrics to determine optimal phase differences simultaneously in a chosen linear direction. A single iteration of a sequential stitching algorithm is used simultaneously to determine the OTF directly without the typical requirement for using multiple iterations of 2-D FFTs associated with local and global error metrics. Future high-speed correlation-based 3-D chips will likely benefit this approach and can be implemented through a pre-planned product improvement approach when these chips become available.

Figure 15:
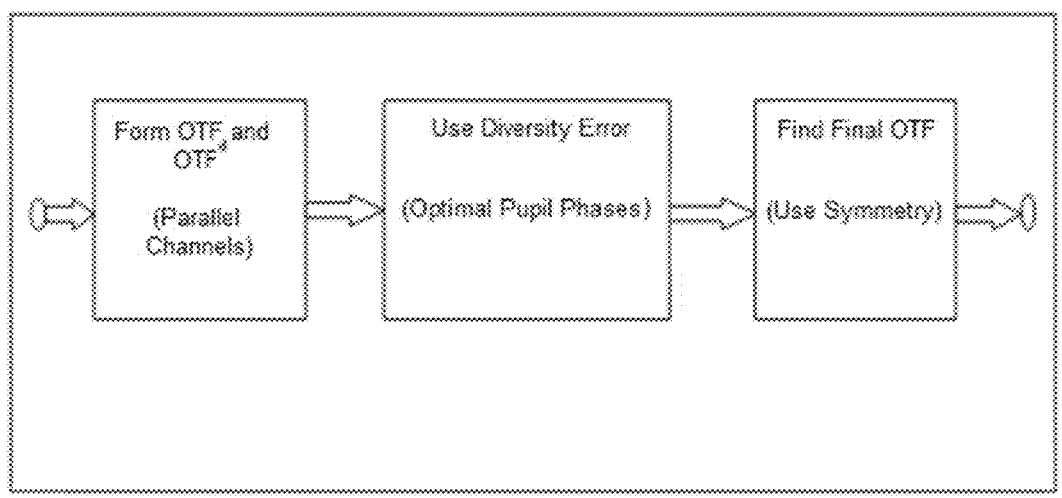
FIG. 15 is a flow diagram of an exemplary correlation-based atmospheric turbulence compensation paradigm.

FIG. 15 shows an expansion of the "Estimate OTF using Parallel Correlation Based Methods" block. In FIG. 15, the first step is to determine the OTF as a function of phase differences for each spatial location of the OTF (channel). Realizations of both the OTF and the diversity OTF are determined. The next block indicates using a multi-diversity approach to determine the optimal phases of the OTF in a sequence of semi-parallel calculations that only require the local multi-diversity error metric. A single iteration stitching algorithm combines all the phase difference information. The stitching algorithm can be done in parallel with the action of determining the optimal pupil plane phases shown in the middle block of FIG. 15. The last block forms the final OTF estimate using the phase information just determined. This method does not require the error metric determination shown in block "c" of FIG. 14. Instead, this step is performed in parallel using only the local error metrics established by the multi-diversity approach.

Thus, the Phase Diversity (PD) post-processing atmospheric turbulence compensation technique has been modified to run efficiently on a general-purpose, parallel-processing computing architecture, overcoming shortcomings of conventional systems. A new multi-diversity feature is also incorporated, which permits other atmospheric turbulence methods, such as wavelength diversity, to be implemented on the parallel-processing computing architecture, either independent from the modified phase diversity approach or complimentary to the modified phase diversity approach. The latter case could be helpful in overcoming some regions of insensitivity in the traditional PD approach.

I claim:

1. An imaging method providing atmospheric turbulence compensation, comprising:
    capturing a subject image pair;
    loading data corresponding to the captured subject image pair into memory associated with a parallel processing device;
    performing a 2-D Fast Fourier Transform on the stored image data and storing the transformed image data;
    developing an optical transfer function estimate from the transformed image data and a suitable error metric;
    applying the optical transfer function estimate to generate a Wiener filter that implements an inverse optical transfer function;
    using the Wiener filter and the transformed image data to estimate an atmospheric turbulence compensated image spectrum;
    correcting the transformed image data based on the atmospheric turbulence compensated image spectrum, to produce corrected image spectrum data;
    applying an inverse 2-D Fast Fourier Transform to the corrected image spectrum data to produce transformed corrected data; and
    storing the transformed corrected data.

2. The method of claim 1, wherein the inverse of the optical transfer function is embodied in a Wiener filter function.

3. The method of claim 1, wherein capturing the subject image pair includes simultaneously capturing two images of a target.

4. The method of claim 3, wherein the two images are captured at respective different wavelengths.

5. The method of claim 3, wherein the two images are captured at the same wavelength with a known phase offset.

6. The method of claim 1, wherein capturing the subject image pair includes collecting sample points of an image pair at an entrance pupil plane of an image capture device.

7. The method of claim 6, wherein developing the optical transfer function estimate includes using a current value of the optical transfer function to determine an entrance pupil phase or phase difference.

8. The method of claim 7, wherein developing the optical transfer function includes evaluating the optical transfer function at discrete locations to determine entrance pupil phase differences, and stitching together the entrance pupil phase differences to determine an entrance pupil phase function.

9. The method of claim 8, wherein developing the optical transfer function further includes estimating the optical transfer function based on an autocorrelation of a generalized pupil function of the image capture device.

10. The method of claim 9, wherein autocorrelation of a generalized pupil function of the image capture device includes determining a function of summations of complex exponential phase differences resulting from the autocorrelation of the generalized pupil function.

11. The method of claim 10, wherein the complex exponential phase differences are single-term optical transfer function solutions.

12. The method of claim 11, further comprising determining a plurality of summations of a sequential number of complex exponential phase differences.

13. The method of claim 12, further comprising combining individual ones of the plurality of summations and the single-term optical transfer function solutions to develop the optical transfer function.

14. The method of claim 13, wherein developing the optical transfer function further includes utilizing potential phase difference solutions stored in one or more look-up tables.

15. The method of claim 1, further comprising determining a region of interest within the captured image pair.

\* \* \* \* \*